United States Patent [19]

Ruehl et al.

[11] Patent Number: 4,654,743
[45] Date of Patent: Mar. 31, 1987

[54] TRANSIENT VOLTAGE PROTECTOR

[75] Inventors: William E. Ruehl, Wheeling; Richard H. Heidorn, Lombard; E. Grant Swick, Bartlett, all of Ill.

[73] Assignee: Illinois Tool Works Inc., Chicago, Ill.

[21] Appl. No.: 741,399

[22] Filed: Jun. 5, 1985

Related U.S. Application Data

[63] Continuation-in-part of Ser. No. 568,178, Jan. 5, 1984, Pat. No. 4,554,609.

[51] Int. Cl.$^4$ .................................. H02H 3/22
[52] U.S. Cl. .................................. 361/111; 361/119; 339/147 R
[58] Field of Search ............... 361/111, 118, 117, 119, 361/131, 392; 339/147 R, 193 VS, 147 C, 147 P

[56] References Cited

U.S. PATENT DOCUMENTS

| | | | |
|---|---|---|---|
| 4,023,071 | 5/1977 | Fussell | 361/118 X |
| 4,239,319 | 12/1980 | Gladd et al. | 339/147 R |
| 4,328,524 | 5/1982 | Nozick | 361/119 |
| 4,388,665 | 6/1983 | Pütz | 361/119 |
| 4,554,609 | 11/1985 | Ruehl et al. | 361/131 X |
| 4,586,104 | 4/1986 | Standler | 361/119 X |

Primary Examiner—A. D. Pellinen
Assistant Examiner—A. Jonathan Wysocki
Attorney, Agent, or Firm—J. P. O'Brien; T. W. Buckman

[57] ABSTRACT

A transient voltage protector is provided for telephone lines and the like. An insulating plastic housing is provided with two pairs of terminals having female connections at the lower ends for association with selected terminals of a telephone terminal block. The upper ends of these terminals are of a male type and extend above the top of the housing for receipt of further elements such as bridging clips, plug-in fuse units, or line status indicators. An offset and raised portion of the housing carries a pair of zener diodes having lower wire terminals connected to two of the aforesaid terminals. The upper wire terminals of the zener diodes are connected to a grounding terminal having an upper portion extending above the housing in the form of two spaced tines for receipt of a common ground wire between the tines. The various terminals and the zener diodes and the housing have complementary structure for positioning of the terminals and the diodes within the housing. In a modification the housing has a second offset and raised portion mounting two gas diodes.

23 Claims, 35 Drawing Figures

TRANSIENT VOLTAGE PROTECTOR

RELATED APPLICATIONS

The present application is a continuation-in-part application based on our prior application Ser. No. 568,178, filed Jan. 5, 1984, now U.S. Pat. No. 4,554,609, for "Transient Voltage Protector" which application was related to and formed an improvement over William E. Ruehl, application Ser. No. 376,862, filed May 10, 1982, now U.S. Pat. No. 4,447,105, for "Terminal Bridging Adapter".

BACKGROUND OF THE INVENTION

Telephone circuits operate on relatively low voltages. Such circuits are sometimes exposed to transient voltages of considerably higher levels than the normal operating voltages. This may be effected by a lightning strike, by a short circuit with a high voltage line, or by other causes. Therefore, it is desirable to provide means for protecting low voltage telephone circuits against such high transient voltages.

It is known to provide plug-in structures for use with telephone terminal blocks to provide connection thereto, including electrical components for protecting against high transient voltages, see for example the aforesaid Ruehl application and U.S. Pat. Nos. 4,113,340; 4,116,524 and 4,126,369.

OBJECTS AND SUMMARY OF THE PRESENT INVENTION

It is generally the object of the present invention to provide a new and improved transient voltage protector.

More particularly, it is an object of the present invention to provide a transient voltage protector having a two-piece interfitting housing providing structure for receiving four contact terminals, a grounding terminal, and a pair of limiting devices.

In attaining the foregoing and other objects of the present invention there is provided a two-piece housing which telescopes in part. Cavities are provided in the main or male portion of the housing for receiving four identical metal terminals positioned so as to engage two vertically adjacent and two horizontally adjacent terminals of a split 66-M terminal block in common use in telephone and other electronic applications. Aligned cavities are provided in the secondary or female portion of the housing for receiving portions of the aforesaid metal terminals with the ends thereof extending outwardly from the housing for connection to other devices, such as bridging clips, plug-on fuse units or line status indicators. A raised side portion of the male housing portion is provided with partially cylindrical cavities for receipt of upstanding zener type diodes having wire contacts received in two of the four metal terminals, and having their other wire contacts received in a grounding terminal. A box-like portion of the female housing part telescopes with the partially cylindrical sections housing the zener diodes. This telescoping of the parts of the housing brings about a rather effective assembly of the parts which is subsequently augmented by sonic welding of two housing parts into a single unit.

The foregoing applies specifically to the disclosure of the parent application. The embodiment added by way of the continuation-in-part application is similar, but the housing is modified to accommodate the gas tubes that were implied in the parent application.

THE DRAWINGS

The present invention will best be understood from the following description when taken in connection with the accompanying drawings wherein:

FIG. 19 is a top view of the grounding terminal forming a part of the present invention;

DETAILED DISCLOSURE OF THE ILLUSTRATED EMBODIMENT

Figure 1:
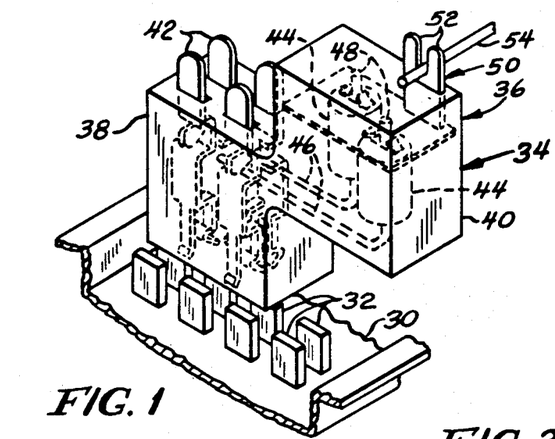
FIG. 1 is a perspective view of a transient voltage protector constructed in accordance with the present invention.
Figure 2:
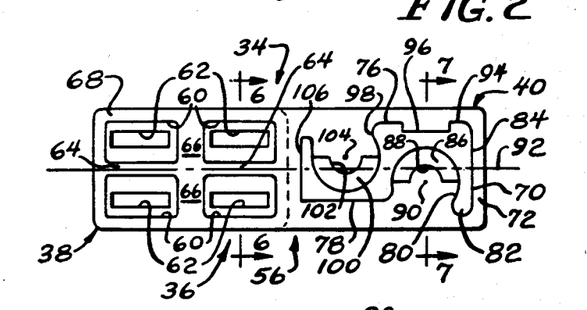
FIG. 2 is a top view of the male housing portion.
Figure 3:
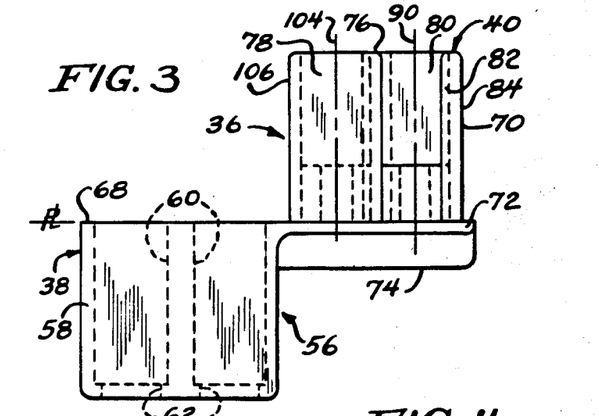
FIG. 3 is a front view thereof.
Figure 4:
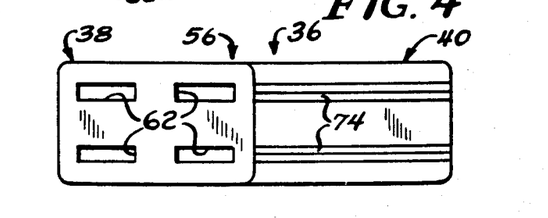
FIG. 4 is a top view thereof.
Figure 5:
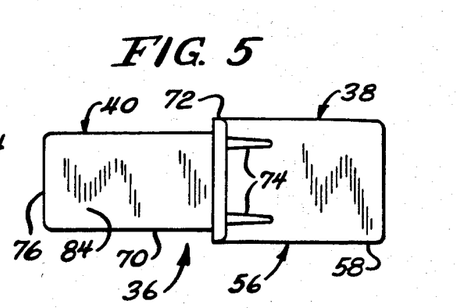
FIG. 5 is an end view thereof.
Figure 6:
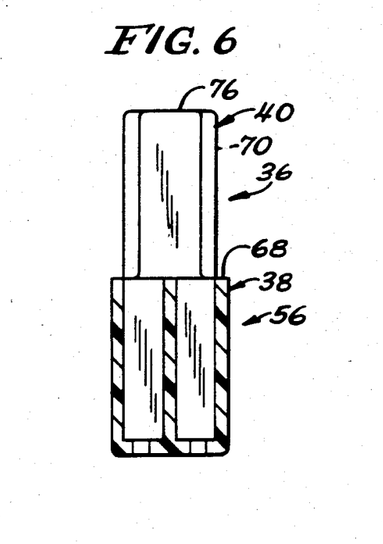
FIG. 6 is a view partially in section taken along the line 6—6 in FIG. 2.
Figure 7:
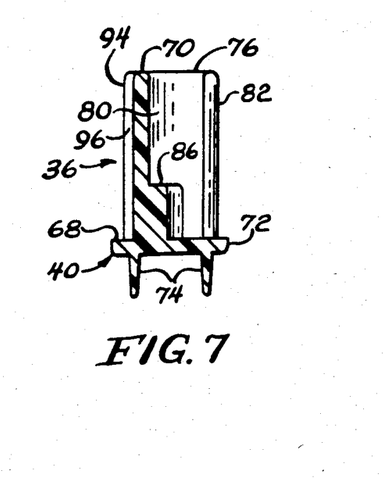
FIG. 7 is a view partially in section taken along the line 7—7 in FIG. 2.

The general arrangement of the present invention may be seen with reference to FIG. 1 wherein there is seen a 66-M terminal block 30 having four pairs of upstanding blade terminals 32 thereon. The transient voltage protector of the present invention is identified generally by the numeral 34 and is intended for physical and electrical association with four of the contacts 32, for example, the four central contacts. The transient voltage protector 34 includes a plastic housing 36 of suitable material such as clear Lexan and is made of two parts which partially telescope and which are sonically welded together as will be apparent hereinafter. The housing includes a terminal portion 38 and a grounding portion 40. The terminal portion 38 houses four sheet metal terminals 42 of novel and identical construction. The grounding portion 40 houses a pair of zener diodes 44, for example those sold by General Semiconductor as TRANSZORB 1.5 KE27C. A lower lead 46 of each zener diode is formed to fit around and through housing portions and into association with the two adjacent terminals 42 in a manner hereinafter to be described. The upstanding zener diode terminals 48 are trimmed short and interfit with a top or grounding contact 50 having a spaced pair of tines 52 upstanding through the top of the housing grounding portion 40 and adapted to receive snugly between them a common ground wire 54.

Figures 8, 9, 10, 11, 12, 13, 14, 15:
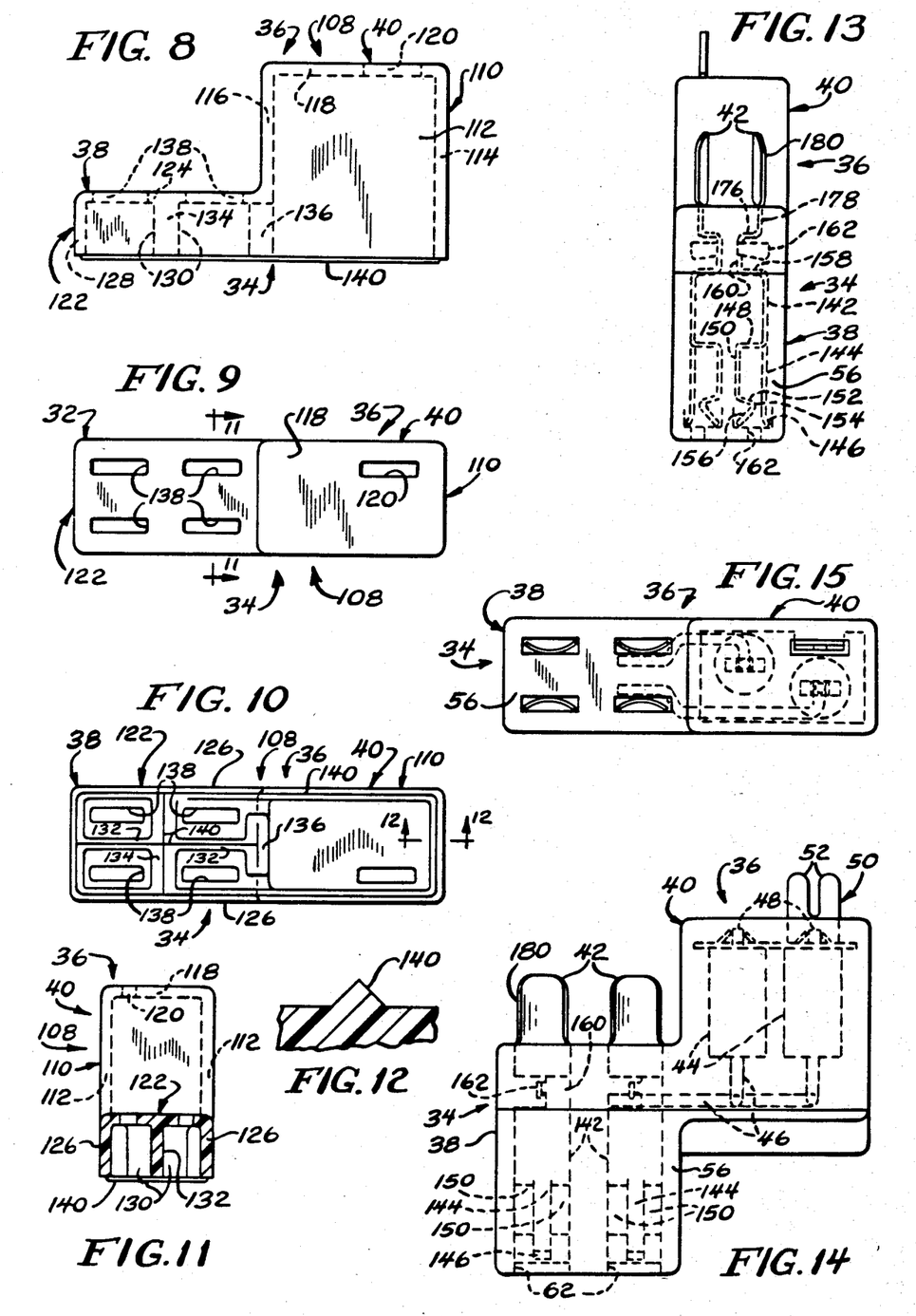
FIG. 8 is a front view of the female or cap housing portion.
FIG. 9 is a top view thereof.
FIG. 10 is a bottom view thereof.
FIG. 11 is a view partially in section taken along the line 11—11 in FIG. 9.
FIG. 12 is a detail sectional view of the energy director as taken along the line 12—12 in FIG. 10, f.i.
FIG. 13 is an end view of the transient voltage protector of the present invention.
FIG. 14 is a front view thereof.
FIG. 15 is a top view thereof.

The housing 36 is further shown in FIGS. 2–15, and in particular there is shown a base or male portion 56 in FIGS. 2–7, and also in FIGS. 13–15. The base or male portion 56 includes a depending portion which is rectangular in front elevtion, in side elevation, and from the top. This depending portion 58 is provided with four vertical cavities 60 respectively for receipt of the terminals 42. Slots 62 of reduced dimension communicate with the bottom ends of the cavities 60 through the bottom of the depending base portion 58 for receipt of the block terminals 32 for cooperation with the sheet metal terminals 42. The cavities 62 are of rectangular outline, the long sides of adjacent cavities being spaced by walls 64 and the short sides being spaced by thicker walls 66.

The depending base portion is provided with a flat upper surface 68 which continues on to an upstanding support portion 70. The upstanding support portion 70 includes a horizontal floor 72 which provides a continuation of the surface 68. A pair of spaced, depending flanges 74 extend from end to end of the floor on the underside thereof.

The upstanding support portion 70 includes an upright block 76 which is rectangular in front elevation and from the end. Block 76 includes a flat front wall 78 and a recess 80 to the right thereof. The recess is cylindrical and comprises somewhat more than a semi-cylinder, having an arcuate forwardly projecting extension 82 on a flat end wall 84. A cylindrical recess 80 is provided with a substantially semi-circular floor 86 on which one of the zener diodes 44 rests, the floor being centrally relieved at 88 to accommodate the lead 46 on the under end of the respective zener diode 44. As will be seen, the center line 90 of the cylindrical recess 80 is offset forwardly from the center line 92 of the base or male portion 56. There is a rear wall 94 behind the recess which is set back or relieved at 96 to present a relatively thin section for molding while retaining the position of the wall 94 for engagement with a further housing portion to be discussed shortly hereinafter.

Offset to the left from the recess 80 there is a rearwardly facing cylindrical recess 98 extending over somewhat greater than a semi-cylinder. This cylinder receives the second zener diode 44, and is provided with a semi-circular floor 100 centrally relieved at 102 so that the floor may suport the zener diode with the lead 46 projecting through the central relieved portion. The center line 104 of the cylindrical recess 98 is spaced rearwardly from the center line or plane 92 previously referred to. The block 76 is completed by a flat left side wall 106 as may be seen.

The housing 36 further includes a female or cap portion 108 seen in detail in FIGS. 8–12. The cap portion 108 includes an upstanding cover 110 of rectangular configuration from all aspects and adapted to overlie and embrace the upstanding support portion 70. The cover includes vertical front and rear walls 112 of nearly square configuration, a right end wall 114 of the same height as the front and rear walls but of lesser width, and a left end wall 116 generally similar to the right end wall, but having a lower margin raised relative to the lower margin of the right end wall as will be apparent shortly hereinafter. The cover 110 further has a horizontal top wall 118 with a slot 120 therein providing clearance for the tines 52. The cover 110 is open at the bottom thereof.

The female or cap portion 108 further includes a plateau portion 122 lying to the left of the cover 110 and of lesser height. The plateau portion includes a top wall 124 joining the lower edge of the wall 116 at right angles thereto. A peripheral wall surrounds the plateau portion on three sides, including front and rear walls 126 respectively coplanar with the front and rear walls 112, and an end wall 128. The plateau is open at the bottom, and four downwardly directed cavities 130 are respectively aligned with the cavities 60 for receiving upper portions of the terminals 42. A median wall 132 and a transverse wall 134 separate the cavities, while a partition wall 136 lies between the cover portion 110 and plateau portion 122. The partition wall 136 is spaced from the front and rear walls 126 and depends from the wall 116 and the top wall 124. Four slots 138 extend through the top wall 124 in respective alignment with the cavities 130 to accommodate the top portions of the terminals 42. The bottom edges of all of the vertical walls of the female or cap portion 108 lie in a common plane, and each edge has a depending right angle flange or energy director 140 designed to abut the upper surface 68 of the base or male portion 56 to concentrate energy in a sonic welding operation to join the female or cap portion 108 to the base or male portion 56.

Figure 16:
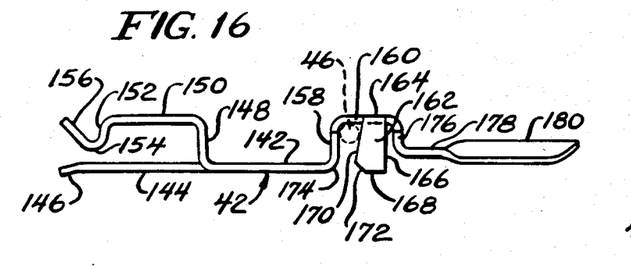
FIG. 16 is a side view of one of the blade terminals forming a part of the present invention.
Figure 17:
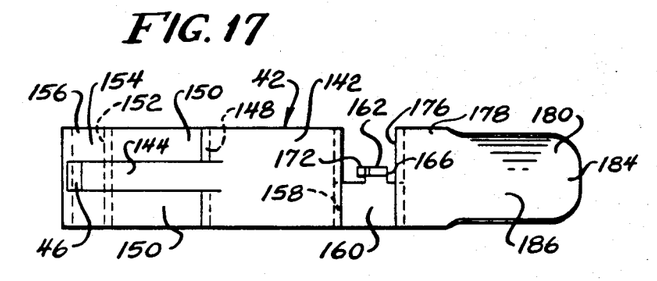
FIG. 17 is a front view thereof.
Figure 18:
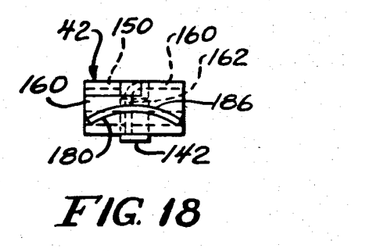
FIG. 18 is an end view thereof.

The terminals 42 all are identical and are shown in some detail in FIGS. 13–15, one thereof being shown in full detail in FIGS. 16–18. The terminals preferably are formed of phosphor-bronze and are solder tinned. Each terminal 42 comprises an integral sheet metal stamping and includes a flat intermediate body portion 142 having a single narrow leg 144 extending therefrom in coplanar relation and having an outwardly deflected tip 146. Lying on either side of the leg 144 are two offsets 148, each having a leg 150 thereon disposed parallel to but spaced from the plane of the leg 144. Each of the legs 150 then has an inwardly directed portion 152 leading to a reversely curved or re-entrant portion 154 having an outwardly deflected tip 156. Thus, one of the box terminals 32 readily enters into the space between the outwardly deflected tips 146 and 152 ultimately to lie between the leg 144 and the reversely curved or re-entrant portion 154 of the two legs 150.

At the opposite or upper edge of the flat body section 142 there is a relatively narrow offset strip 158 lying adjacent one margin of the flat section 142 and of somewhat less than half the width thereof. A wire mounting section 160 is coplanar with the legs 150 and extends from the end of the offset section 158. A wire mounting ear 162 extends from one side of the wire mounting section 160 and lies at right angles thereto.

The wire mounting ear 162 is of pentagonal outline, having a connecting edge 164 and an elongated rear edge 166 extending at right angles thereto. An outer edge 168 is parallel to the edge 164 in spaced relation thereto, being at right angles to the rear edge 166.

A wire engaging or gripping edge 170 extends from the attachment edge 164 and forms an angle of approximately 100 degrees therewith, i.e., an angle of 10 degrees with a transverse plane normal to the wire attached section 160. The edge 170 is spaced from the offset section 158 in converging relation therewith, and extends substantially to the plane of the flat body section 142, being joined to the outer edge 168 by a 45 degree converging edge 172. One of the zener diode leads 46 is gripped between the offset section 158 and the converging edge 170 of the ear 162, lying aganst the wire mounting section 160 as shown in FIG. 16. The angular edge 172 and the opposite round corner 174 joining the offset section 158 and the flat section 142 aid in snapping the terminal wire 46 into such position.

A full width offset section 176 leads from the far edge of the wire mounting section 160 back toward, but not completely to the plane of the flat section 142, there being a connecting section 178 extending from the upper end of the offset section 176 to a blade terminal 180 having a rounded upper end 182. The blade terminal 180 is straight, but is curved in a shallow curve 186 about its longitudinal center line 184. This curvature provides for a tight, resilient engagement with bridging clips, etc. secured to the upper end of the terminal.

It will be understood that the terminal 42 as just disclosed is efficient in the use of stock material. All of the various parts are struck from within a rectangular outline. Even the right angularly disposed wire mounting ear 162 is struck from the area that becomes the blank space to the side of the wire mounting section 160. Curving of the blade terminal 180 about the longitudinal sectional line thereof produces a lateral foreshortening as readily seen in FIG. 17, but the blade terminal occupies the full width of the initial rectangular blank before such curving.

Figure 20:
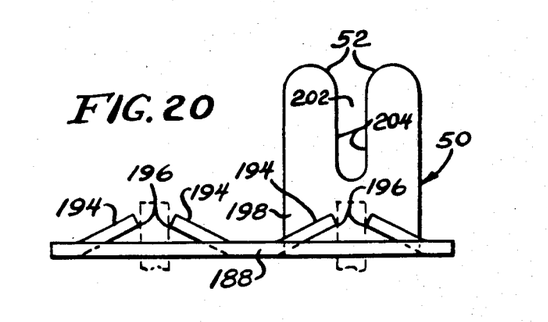
FIG. 20 is a front view thereof.
Figure 21:
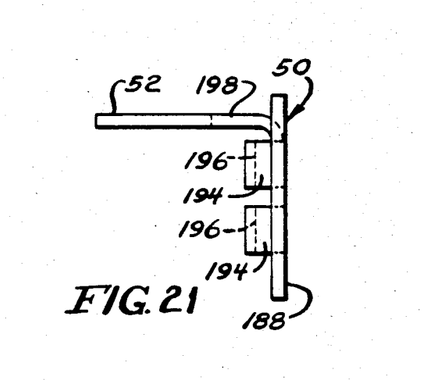
FIG. 21 is an end view thereof.

The grounding terminal 50 is shown generally in FIGS. 1, 15 and 16, and more specifically in FIGS. 19-21. In the latter, the grounding terminal 50 will be seen to have a generally rectangular base 188 having two rectangular holes 190 punched therein on opposite sides of the center line 192 and longitudinally offset. Four shear tabs 194 arranged in respective pairs about the holes 190 are partially struck upwardly from the surface of the base 188 to provide confronting right angle or sharp edges 196 spaced in pairs on opposite sides of the holes 190 and raised from the base 188. The spacing between each pair of confronting edges 196 is less than the diameter of one of the terminal leads 48 so that the terminal leads can be pushed up through the holes to be impinged against tightly by the edges 196.

The grounding terminal 50 further is provided with an upstanding flange 198 spaced slightly in from one edge of the base at 188 (the base is rectangular) leaving an edge opening notch 200 adjacent one corner of the base. The tines 52 are formed integrally with this flange and are separated by a notch 202 having elongated straight edges 204 to engage the common ground wire 54. As will be apparent, the base 188 and most of the flange 198 are disposed beneath the top wall 118 of the cap portion 108 with only the tines 52 and a minor portion of the flange 198 extending above the top wall.

All of the parts of the present transient voltage protector have now been described. Interfitting of the parts is highly efficient. The bottom ends of the terminals 42 rest on the bottom wall of the base or male portion 56, being slightly larger than the apertures 62 in the bottom wall. The upward position of the terminals is determined in part by gravity and is limited by the fact that the offsets 176 abut the underside of the top wall 124 of the plateau portion of the cap portion. From the foregoing the mid portions of the terminals are positioned just above the depending base portion 58 with the offset portion 158 lying just into the plateau portion so that the terminals 46 may readily lie on top of the offset portions 158 of the two adjacent terminals and against the wire mounting section 180, being held tightly by the wire mounting ears 162.

At the same time the two zener diodes 44 are supported by the circular bottom wall or floor portions 86 and 100 with the diode terminals 46 extending through the relieved arcuate portions 88 and 102 thereof. These terminals tend to limit the upward position of the diodes, and a positive upward limitation is applied by the leads 48 abutting the underside of the top wall of the cover 110 of the female or cap portion 108. The grounding terminal 50 is positioned by bottoming on the tops of the zener diodes 44 with the spaced tines 52 extending upwardly and out of the housing, similar to the upper ends of the terminals 42.

The raising and offsetting of the portion of the housing carrying the zener diodes provides clearance adjacent the 66-M block, as is necessary due to the small size of the latter.

In the invention as heretofore shown and described the housing encloses the pair of TRANSZORB zener diodes, and shorting gas tubes which are usually used in such installations are not shown, but are provided externally. In a modification of the invention provision is made for internal housing of the gas tubes, and this is hereinafter described in connection with FIGS. 22-27. Identical parts are identified by the same numerals as used heretofore, while similar but slightly different parts are identified by the use of the same numerals plus the addition of the suffix a.

Figure 22:
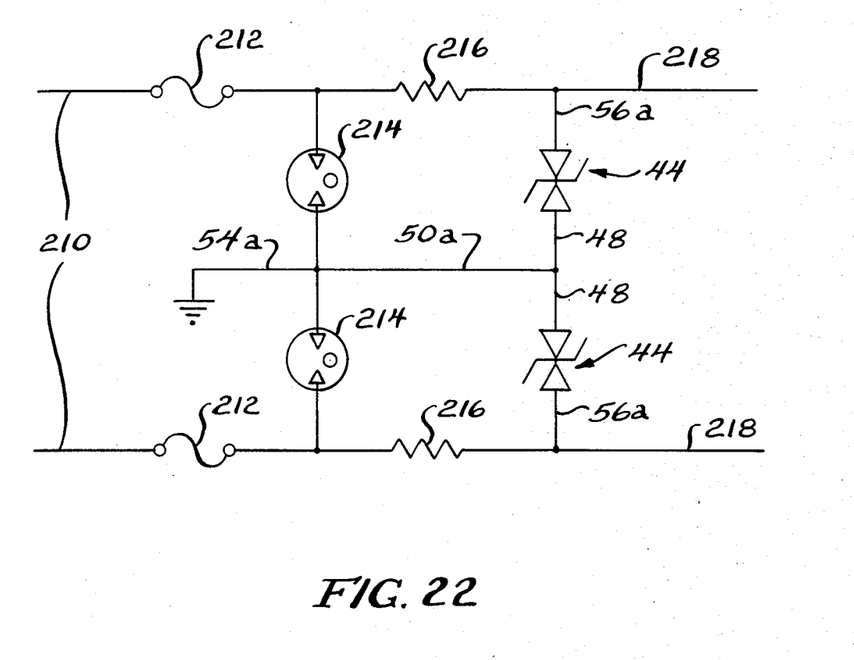
FIG. 22 is an electronic wiring diagram of the embodiment of the invention incorporating gas diodes.

FIG. 22 is an electrical wiring diagram that illustrates the electrical principles of the present invention. The incoming two wire line is identified at 210, the two wires respectively having fuses 212 connected in series therein. Gas tubes 214 are respectively connected to the lines 210 downstream of the fuses 212 and to a ground line 54a. At normal operating voltage on the line 210 the gas tubes are open circuit and substantially infinite impedance. However, when high, transient voltages appear on the line, or either side thereof, the gas tubes or respective tube break down to short the line to ground.

These gas tubes, by way of example, may be LUMEX GT-BG145L.

Downstream of the gas tubes 214 the wires 210 of the line are provided with series resistors 216 leading to the two wires 218 of the output line, the TRANSZORB zener diodes 44 being shunted across these wires to ground 54a through the connector 50a and the zener leads 48 and 56a.

Figure 23:
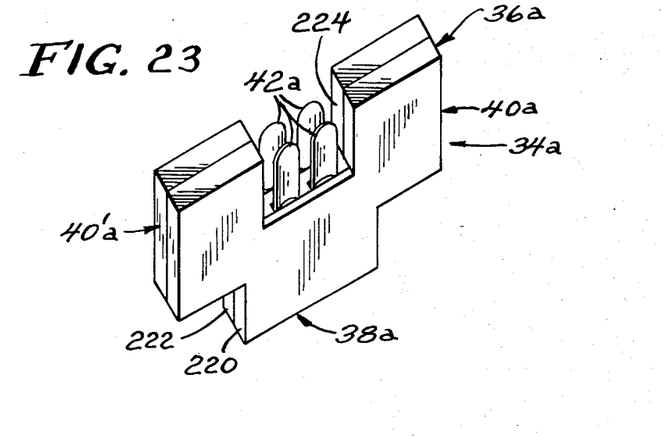
FIG. 23 is a perspective view of a modified form of the invention showing the housing as adapted to enclose gas diodes.
Figure 24:
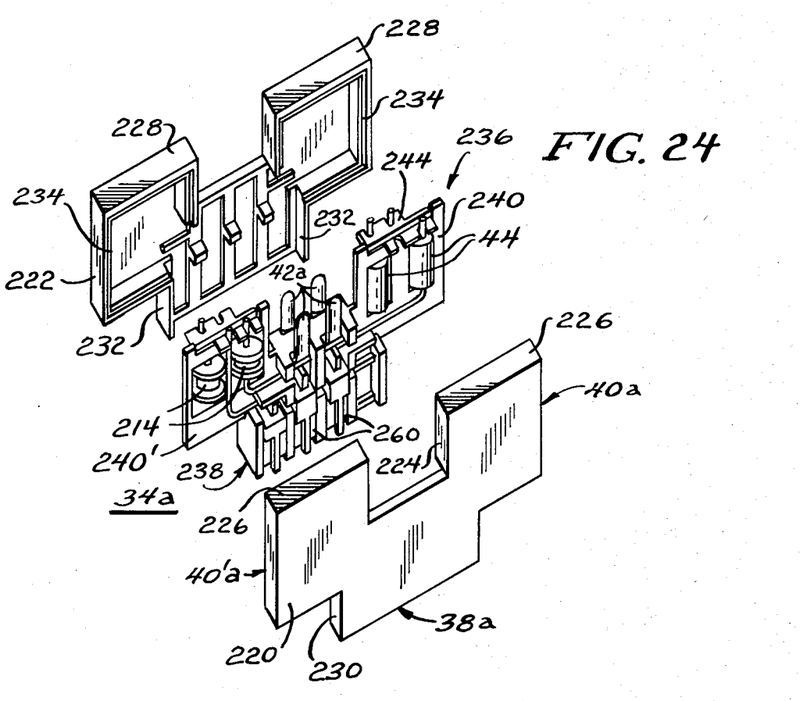
FIG. 24 is a perspective view similar to FIG. 23, but showing the parts in exploded relation.
Figure 25:
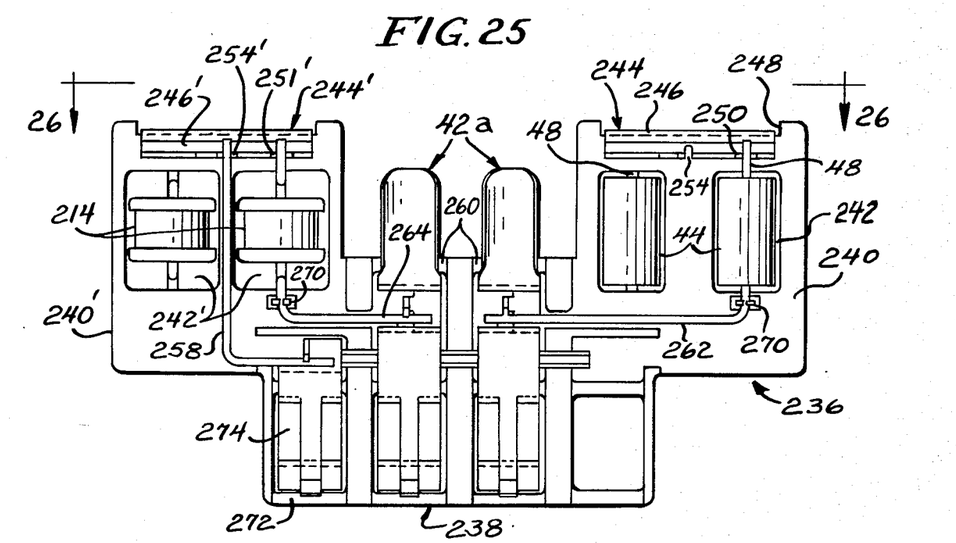
FIG. 25 is a front view of the mounting board or spacer.

Referring next to FIGS. 23 and 24, the modified form of the transient voltage protector is identified generally by the numeral 34a and interconnects with the terminal block 30 (not shown in FIGS. 23 and 24) in precisely the same way as does the prior disclosed form of the invention. The transient voltage protector 34a includes a plastic housing 36a generally similar to that previously disclosed, and made of suitable materials such as clear Lexan plastic, and comprises two front and rear halves 220 and 222 of substantially mirror image relation which are ultimately sonically welded together. The housing includes a terminal portion 38a, and two elevated side portions 40a and 40'a. Four terminals 42a extend upwardly from the terminal portion 38a in a valley 224 formed between the two side portions 40a and 40'a. The side portions are provided with confronting and interfitting walls about the outer margins thereof continuing as confronting vertical walls 230 and 232 on the terminal portion 38a. These walls ultimately are sonically welded together.

The walls 226 and 228 are recessed at 234 to receive and support the edges of a mounting member 236 seen in FIGS. 24–27.

Figure 26:
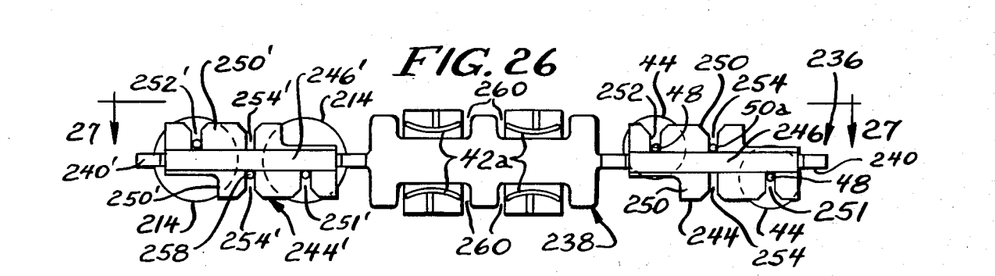
FIG. 26 is a top view thereof as taken substantially along the line 26—26 in FIG. 25.
Figure 27:
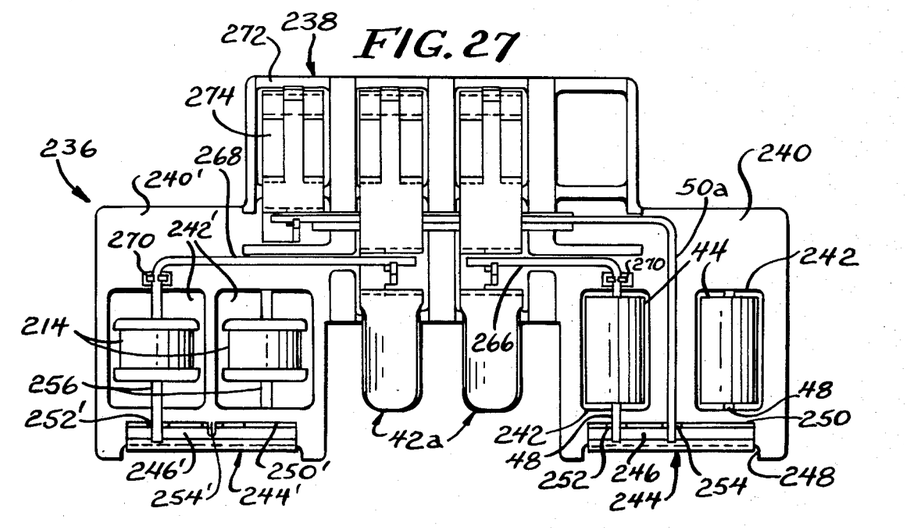
FIG. 27 is a reverse or rear view thereof as taken substantially along the line 27—27 in FIG. 26.

The mounting member 236 comprises a central body portion 238 of rather substantial transverse dimension, and raised and outwardly extending, relatively flat end walls 240 and 240'. The end wall 240 is provided with rectangular windows 242 in which the TRANSZORB zener diodes 44 are mounted, respectively offset in opposite directions from the plane of the wall 240 as best seen in FIG. 26. The offset is such that the ground terminals 48 lie on opposite sides of the wall 240 and extend upwardly.

A sheet metal ground contact 244 has a central saddle portion 246 that clips over the top edge of the wall 240 at a recess 248 therein. Skirt portions 250 extend outwardly in opposite directions away from the wall 240 and are provided with slots or notches having tapered outer portions opening outwardly of the skirts 250 and respectively receiving the ground wires 48. These slots 252 are of proper transverse dimension so as to grip the ground wires aggressively and form an excellent electrical contact therewith. The skirts further include edge opening slots or notches 254, again having tapered outer portions, one of which receives the ground wire 50a in gripping engagement. The other is idle. As will be seen particularly in FIG. 26 the sheet metal ground member 244 is rotationally symmetric so that it may be installed on the wall 240 in either of the two possible directions.

The left end portion or wall 240' is similar to the right wall 240 and is provided with windows 242' in which the gas tubes 214 are mounted in substantially the same fashion as the zener diodes 44 are mounted. A sheet metal ground member 244' is identical with the sheet metal ground member 244, and similar parts are identified by the same numerals with the addition of a prime mark. Ground leads 256 of the gas tubes 214 are connected to the sheet metal ground member 244' in the same manner as the zener diodes 44 are connected to the sheet metal ground member 244. In addition, a ground wire 258 is received in tight engagement in the notch or slot 254' of the sheet metal ground member 246'.

Four recesses 260 are provided in the body portion 238 of the mounting member 236, two on either face thereof, and receive sheet metal terminals 42a similar to the terminals 42 previously described in detail. Leads 262 and 264 respectively from one of the zener diodes 44 and one of the gas tubes 214 lead to respective ones of the terminals 242a, being held therein by the structure previously described. Leads 266 and 268 respectively from the other zener diode 44 and gas tube 214 lead to two others of the terminals 42a. The mounting member 236 is molded of a suitable plastic, and integral clips 270 formed on appropriate locations of the faces of the mounting member 236 appropriately grip and support the leads 262, 264, 266 and 268.

There are additionally recesses 272 formed in the lower part of the body portion 238 to receive a pair of terminals 274 which are similar to the terminals 42 and 42a, but lacking the blade terminal portions. The ground wires 50a and 258 are received by these two terminals.

The mounting member 236 and parts mounted thereon are positioned as shown in FIG. 24 between the two halves of the plastic housing 36a, as the three parts are brought into engagement in the position shown in FIG. 23. A sonic welding process then is used to fuse the two halves of the housing together and to fuse the mounting member in place in unity with the housing halves.

Figure 28:
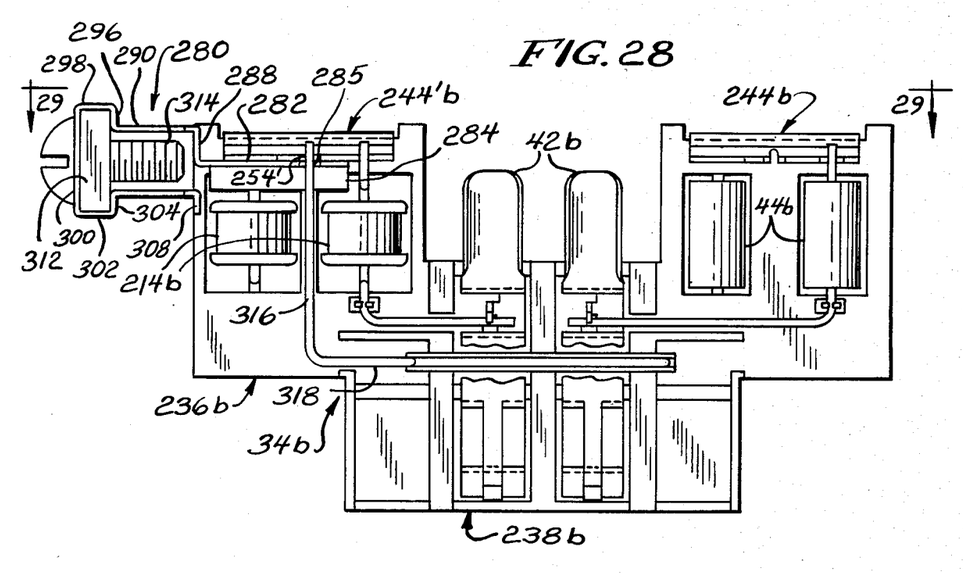
FIG. 28 is a view similar to view 25 showing a modification of the invention.
Figure 29:
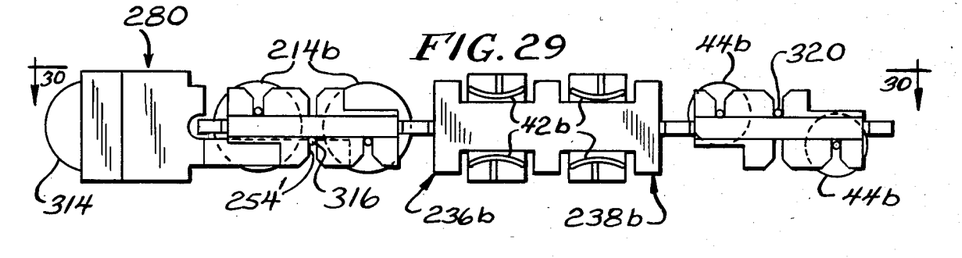
FIG. 29 is a view similar to FIG. 26 and taken along the line 29—29 in FIG. 28.
Figure 30:
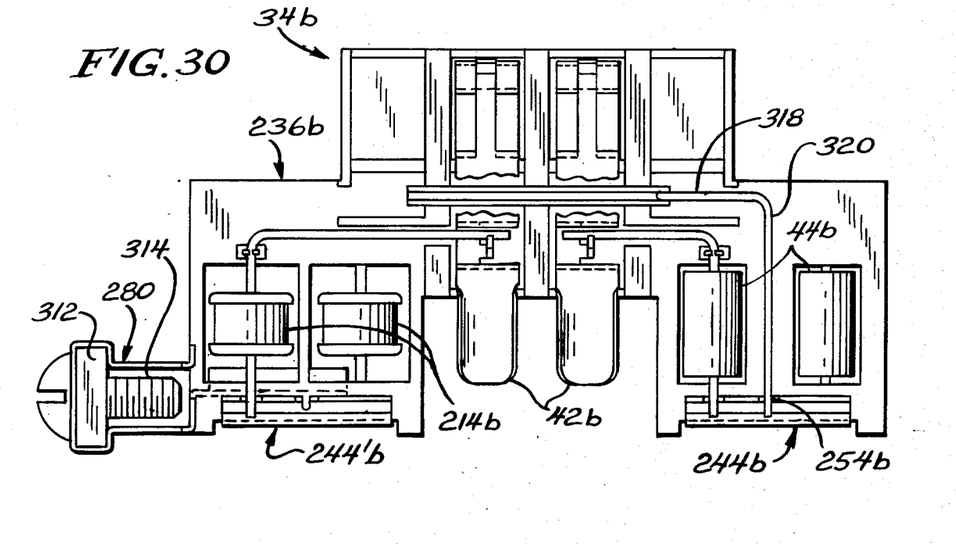
FIG. 30 is a view similar to FIG. 27 and taken along the line 30—30 in FIG. 29.

A further embodiment of the invention is illustrated in FIGS. 28–30, and in these figures the same numerals are used with the addition of the suffix b to avoid needless duplication of description. In the embodiments of the invention as heretofore shown and described the ground contact has simply plugged in to the base block with which the connector is associated. In a more common base block, known as the split 66M block there is no plug-in ground connection. The present embodiment of the invention is intended for such use, and a side ground is provided as will become apparent.

In the previous form of the invention the sheet metal ground contacts 244 and 244' have been connected by wires or leads to the pair of terminals 274 which provide ground potential to the ground contacts 244. In the present embodiment of the invention there are no such ground terminals 274. Instead, there is a side ground connector 280 (shown in detail in FIGS. 31-33 as well as in FIGS. 28–30) which interfits with the mounting member 36b and which extends through the housing 36b (FIG. 34) through suitable slots or notches therein.

Figure 31:
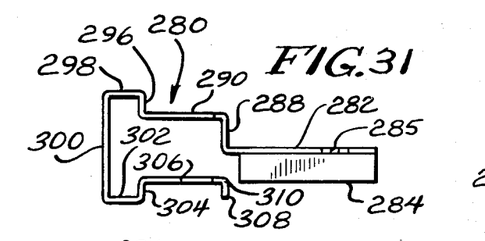
FIG. 31 is a detail side view of the grounding terminal of FIGS. 28-30.
Figure 32:
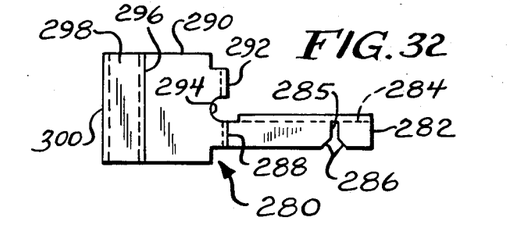
FIG. 32 is a top view of the grounding terminal of FIG. 31.
Figure 33:
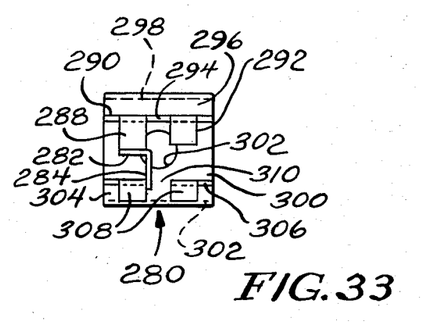
FIG. 33 is an end view of the grounding terminal as taken from the right side of FIG. 31.

The side ground connector 280 is stamped of sheet metal which may be the same metal as used for the ground contacts 244 and 244'. By way of preferred example this is a tinned phosphorbronze. All of the parts of the side ground connector 80 are integral and include a horizontal arm 282 having a depending flange 284 thereon. The horizontal arm 282 is provided relatively near the end thereof with a recess or notch 285 opening at the edge of the arm through tapered or relieved corners 286. This notch aligns with a notch in the ground contact 244'b as will be noted hereinafter.

The flange 282 is relatively narrow, and at the left end integrally connects with an offset 288 at right angles to the flange, and connected integrally at its upper end with a horizontal wall 290. The wall 290 is much wider than the flange 282, and is provided with a downwardly extending tab 292 which is parallel to and of nearly the same length as the offset 288. There is an edge opening recess 294 between the offset 288 and tab 292 which preferably has a semicircular inner end to resist metal fracture. The adjacent end of the divider or mounting member 236b is intended to lie within the recess 294 with the offset 288 and tab 292 lying on the inside of the end wall of the housing.

An upstanding flange extends along the left edge of the wall 290 and has a bight 298 extending to the left thereof and carrying a depending vertical wall 300 which has a central aperture 302, and which depends to below the bottom edge of the flange 284. At the lower edge the wall 300 is provided with a bight 302 extending to the right thereof in horizontal position, and having an upstanding flange 304 at its right edge which is coplanar with the flange 296. The flange 304 has at its top edge a bottom wall 306 parallel to and spaced from the top wall 290. The wall 306 has at its right end a depending pair of tabs 308 spaced by a recess 310 which has a vertical projection coinciding with the previously mentioned recess 294 for stablizing engagement with the edge of the mounting member 236b.

A square nut 312 is received within the side ground connector 28, specifically lying between the wall 300 and the flanges 296 and 304, and engaged by the bights 298 and 302. A screw 314 extends through the aperture 302 in the wall 300 and is threaded through the nut 312 so that a wire, or suitable buss, or other connector may be clamped against the walls 300 of a plurality of transient voltage protectors by the heads of the respective screws 314.

The notch 285 aligns with one of the notches 254' with the arm 282 lying in surface engagement with the respective skirt 250', and a ground wire 316 is bigtingly received in the notches 282 and 254'. The wire descends vertically to a transverse horizontal cross-over portion 318 which extends across the mounting member 236b and then vertically at 320 to be received in a respective notch 254b of the ground contact 244b. The vertical wire portions 316 and 320 lie on opposite faces of the mounting member 236b, so the wire must extend through the mounting member, conveniently relatively toward the right end of the horizontal portion 318.

Figure 34:
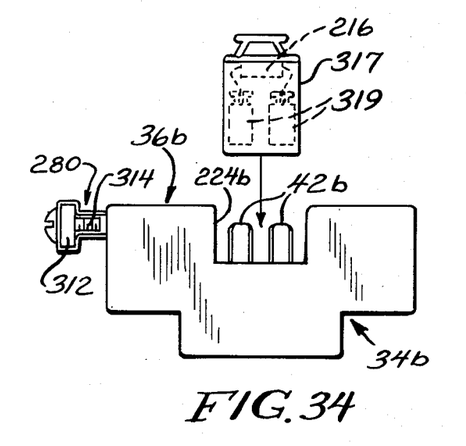
FIG. 34 is a front view on a reduced scale of the embodiment of FIG. 28 showing a plug-in resistor unit.

As may be seen in FIG. 34 the portions of the ground connector 280 to the left of the offset 288 and the tab 292, and the tabs 308 extends out of the housing, carrying the nut 312 and the screw 314. The aforesaid flange and tabs are disposed interiorally of the housing, as are the horizontal arms 282 and flange 284. When a plurality of the transient voltage connectors are plugged into a split 66M block these screws and nuts are all aligned so that a common ground buss may readily be connected thereto.

The resistors 216 have not previously been shown except in the schematic wiring diagram of FIG. 22. They are entirely exterior to the housing such as 36b. However, they are preferably arranged for plug-in assembly with the housing as shown in FIG. 34. Specifically, a plastic housing 317 is provided of a proper size to fit within the valley 224b of the housing 36b and is provided with openings to receive the spade terminals 42b. Within the housing 317 there are provided four female terminals 319 to receive the respective spade terminals 42b. The terminals are connected to the resistors 216 which are housed within the housing 316. Upon installation of the housing 317 within the valley 222b the resistors 216 are brought into electrical relationship with the zener diodes 44 and the gas tubes 214 as shown electrically in FIG. 22.

Figure 35:
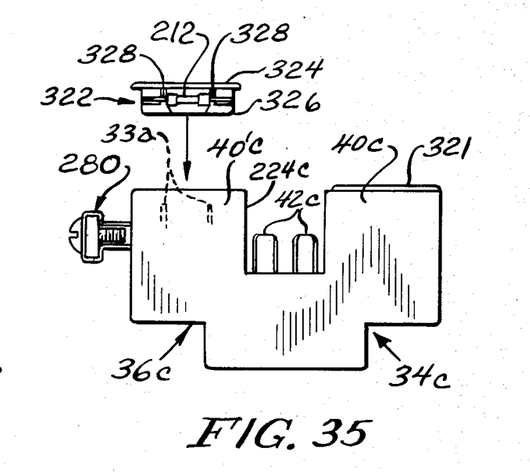
FIG. 35 is a view similar to FIG. 34 showing a fuse unit to be incorporated in an extended portion of the housing.

In the past it has been common practice to locate the fuses 212 (FIG. 22) remotely of the housing 36b. However, in accordance with a further modification as shown in FIG. 35 the fuses may be disposed within this housing. Similar parts are again identified by similar numerals with the addition of the suffix c to avoid prolixity of disclosure. The distinction resides in extension of the elevated side portions 40c and 40'c higher than previously. These elevated side portions are open at the top. The side portion 40c simply is closed by a plug-in cap 320. A cap 322 for the elevated side portion 40'c has a covering top plate 324 and a slightly smaller body 326 depending therefrom that will fit within the elevated side portion 40'c. The depending body 326 is suitably recessed to receive and retain the fuses 212 with short terminal leads 328 extending axially from the fuses in both directions. Four split terminals 330 are mounted within the upstanding side portion 40'c of the housing 36c for receipt of the terminal leads 328 when the cap 322 is applied to the upstanding side portion 40'c. This connects the fuses into the circuit as electrically shown in FIG. 22.

The specific examples of the invention as herein shown and described are for illustrative purposes only. Various changes in structure will no doubt occur to those skilled in the art and will be understood as forming a part of the present invention insofar as they fall within the spirit and scope of the appended claims.

The invention is claimed as follows:

1. A transient voltage protector housing such as for telephone circuits and the like comprising two molded parts respectively comprising a base part having cavity means therein for receipt of a plurality of terminals, and an upstanding offset portion integral with said base part and shaped to accommodate voltage limiting means, the second part comprising a cap portion having a cover fitting over and interfitting with said upstanding portion, and an integral lateral portion overlying said cavity means.

2. A transient voltage protector housing as set forth in claim 1, wherein said upstanding portion has a cavity shaped as at least a part of a cylinder which receives a cylindrical voltage limiting means.

3. A transient voltage protector housing as set forth in claim 1, wherein said upstanding portion has two edge opening cavities opening in opposite directions and each shaped as at least a part of a cylinder which receives a pair of voltage limiting devices.

4. A transient voltage protector housing as set forth in claim 2, wherein said upstanding portion has at least a partial floor adjacent said cavity which supports a cylindrical voltage limiting means.

5. A transient voltage protector housing as set forth in claim 3, wherein each of said partial cylindrical cavities is provided with at least a partial floor which supports a cylindrical voltage limiting device therein.

6. A transient voltage protector housing as set forth in claim 1, further including a plurality of openings in the top and bottom of said housing respectively aligned with said cavity means.

7. A transient voltage protector as in claim 6, further comprising a plurality of terminals mounted in said cavity means and aligned with said openings, said terminal means extending through said openings in one direction and not in the other direction, voltage limiting means received in the shaped portion and connected to at least some of said aforesaid terminals, and a grounding terminal connected to said voltage limiting means and extending from said housing.

8. A transient voltage protector as set forth in claim 7 wherein said voltage limiting means comprises at least one cylindrical device, and wherein the shaped portion comprises at least a portion of a cylinder.

9. A transient voltage protector as set forth in claim 8 and further including at least a partial floor adjacent said partial cylinder for supporting said voltage limiting device therein.

10. A transient voltage protector for telephone circuits and the like comprising an insulating plastic housing having a lower portion and an offset upper portion, a plurality of terminals in said lower portion and at least some thereof each having a female connector thereon disposed within said housing, said housing having aperture means therein aligned with said female connectors which admits male terminals such as on a telephone connector, at least certain of said plurality of terminals each having a male connector, said housing having opening means through which said male connectors pass, voltage limiting means in said upper housing portion, means connecting said voltage limiting means to at least one of said terminals, and a grounding connector in said upper housing portion, means connecting said voltage limiting means to said grounding connector; said grounding terminal connector includes at leat one edge opening slot adapted to receive a ground wire, and said edge opening slot being defined by a pair of spaced tines.

11. A transient voltage protector as set forth in claim 2 wherein the grounding terminal connector includes a sheet metal flange having at least one edge opening slot therein.

12. A transient voltage protector for telephone circuits and the like comprising an insulating plastic housing having a lower portion and an offset upper portion, a plurality of terminals in said lower portion and at least some thereof each having a female connector thereon disposed within said housing, said housing having aperture means therein aligned with said female connectors which admits male terminals such as on a telephone connector, at least certain of said plurality of terminals each having a male connector, said housing having opening means through which said male connectors pass, voltage limiting means in said upper housing portion, means connecting said voltage limiting means to at least one of said terminals, and a grounding connector in said upper housing portion, and means connecting said voltage limiting means to said grounding connector; said housing having a second upper portion offset oppositely to said first-mentioned offset upper portion.

13. A transient voltage protector as set forth in claim 1 wherein said housing comprises a pair of confronting, mating shells, and a mounting member disposed between said shells.

14. A transient voltage protector as set forth in claim 13 wherein said housing has a second upper portion offset oppositely to said first-mentioned offset upper portion.

15. A transient voltage protector as set forth in claim 12 and further including second voltage limiting means disposed in said second raised portion of said housing.

16. A transient voltage protector as set forth in claim 13 wherein said mounting member includes a wall having aperture means therein in which said voltage limiting means is mounted.

17. A transient voltage protector as set forth in claim 16 wherein said wall has a top edge and wherein said grounding terminal connector comprises a sheet metal saddle overlying the top edge of said housing and having oppositely extending skirts with edge opening slots therein for receiving connecting wires.

18. A transient voltage protector as set forth in claim 16 wherein said mounting member includes a pair of walls respectively disposed in said offset upper portions, each of said walls being apertured for mounting said voltage limiting means.

19. A transient voltage protector as set forth in claim 17 wherein each of said walls has a top edge, and a pair of grounding terminals each comprising a sheet metal saddle respectively disposed over said top edges and each having oppositely extending skirts with edge opening slots therein for receipt of connecting wires.

20. A transient voltage protector for telephone circuits and the like comprising an insulating plastic housing having a lower portion and an offset upper portion, a plurality of terminals in said lower portion and at least some thereof each having a female connector thereon disposed within said housing, said housing having aperture means therein aligned with said female connectors which admits male terminals such as on a telephone connector, at least certain of said plurality of terminals each having a male connector, said housing having opening means through which said male connectors pass, voltage limiting means in said upper housing portion, means connecting said voltage limiting means to at least one of said terminals, a grounding connector in said upper housing portion, means connecting said voltage limiting means to said grounding connector, an external side ground connector extending from said housing and having a part thereof inside said housing, and means electrically connecting said side ground connector to said grounding connector.

21. A transient voltage protector as set forth in claim 20 wherein said external side ground connector is mounted in said upper housing portion with a part interior to said upper housing portion in physical engagement with said grounding connector, and a common lead connected to both of said grounding connectors.

22. A transient voltage protector as set forth in claim 1 and further including a plug-in resistor unit, said unit comprising a housing and resistor means in said housing, said unit further including separable terminal means, and separable terminal means in said housing electrically connectable with said terminal means of said plug-in unit.

23. A transient voltage protector as set forth in claim 1 and further including a plug-in fuse unit, said unit comprising a housing and fuse means in said housing, said unit further including separable terminal means, and separable terminal means in aid housing electrically connectable with said terminal means of said plug-in unit.

* * * * *